March 7, 1933.   T. H. OPPENHEIM   1,900,299
ATTACHMENT FOR FERTILIZER DISTRIBUTORS
Filed Jan. 5, 1931   3 Sheets-Sheet 2
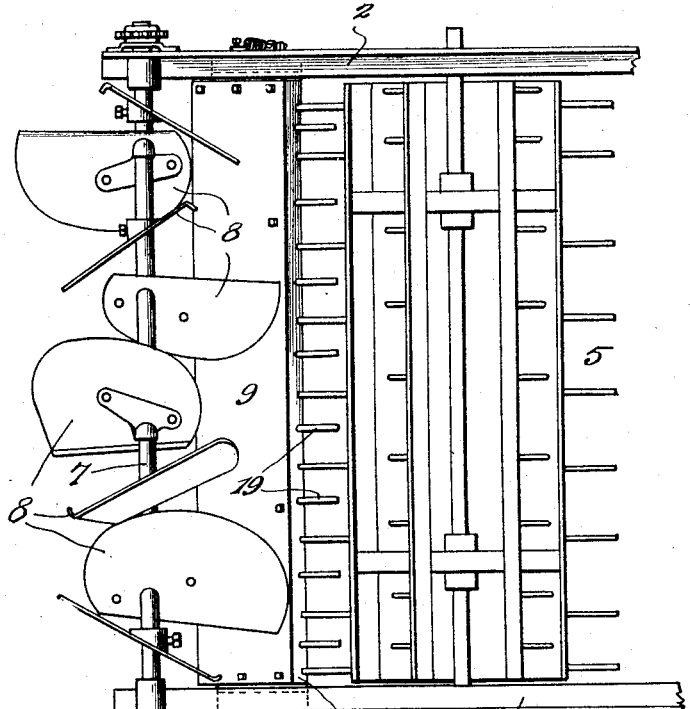
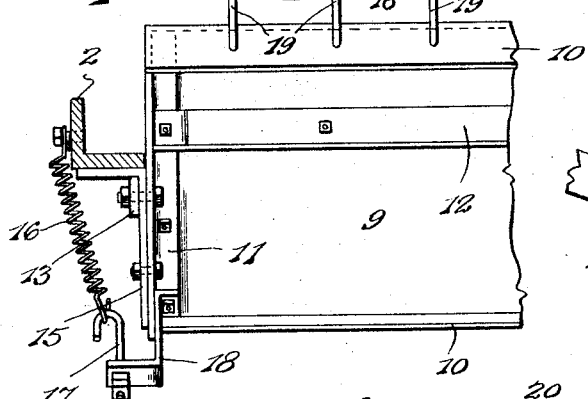
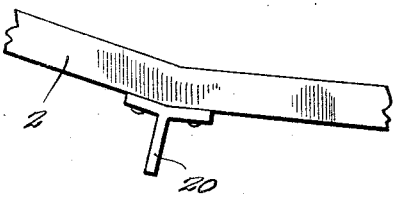
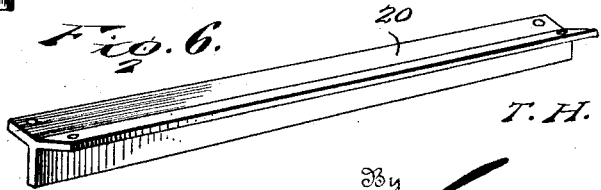
Inventor
T. H. Oppenheim.
By Lacey & Lacey,
Attorneys

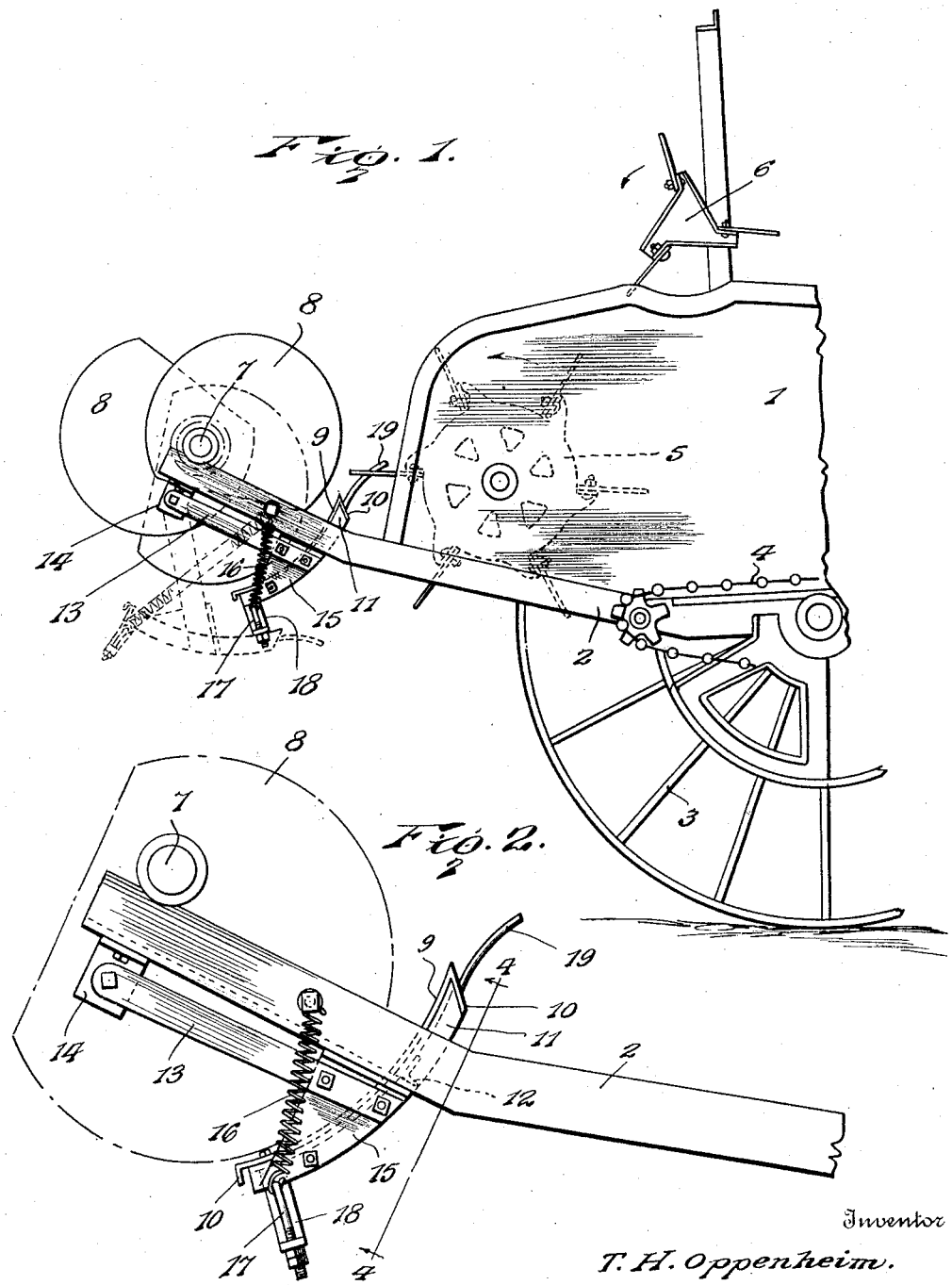

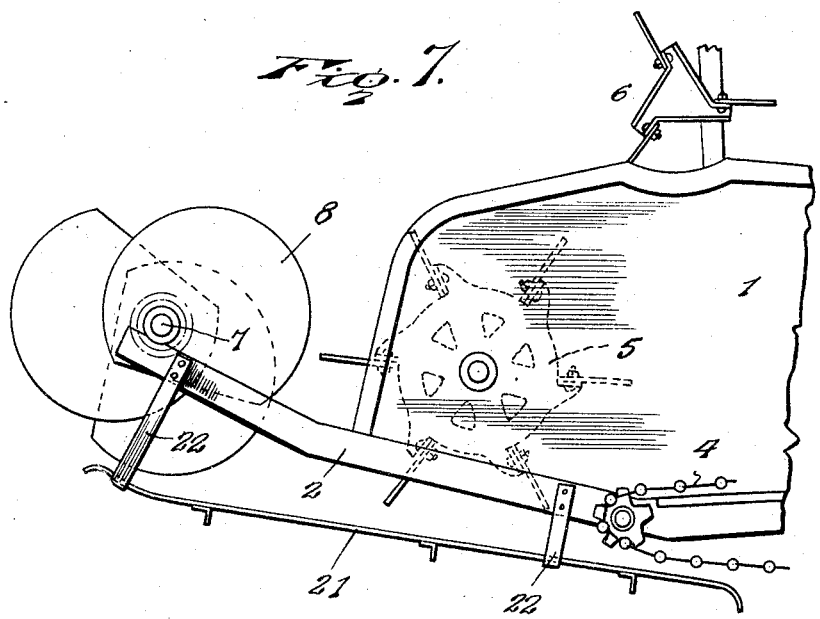
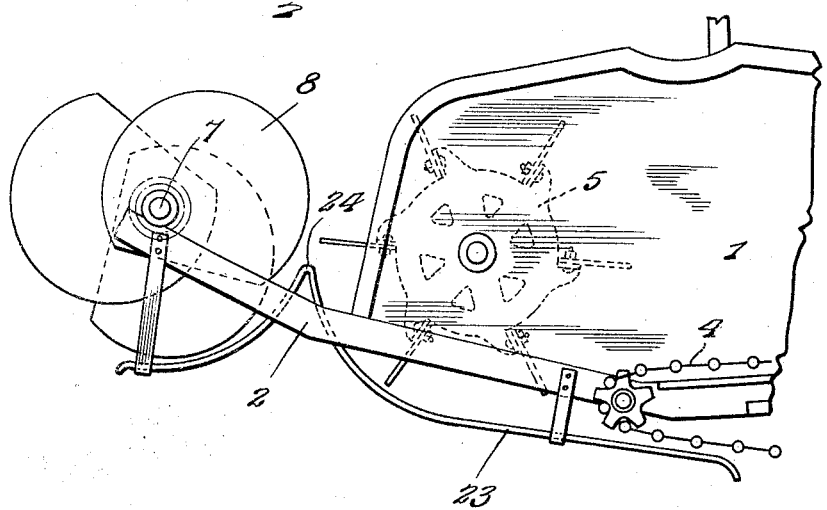

Patented Mar. 7, 1933

1,900,299

UNITED STATES PATENT OFFICE

THEODORE H. OPPENHEIM, OF COLDWATER, OHIO, ASSIGNOR TO THE NEW IDEA SPREADER COMPANY, OF COLDWATER, OHIO, A CORPORATION OF OHIO

ATTACHMENT FOR FERTILIZER DISTRIBUTORS

Application filed January 5, 1931. Serial No. 506,733.

Fertilizer distributors now generally embody a wagon box, the bottom of which is a conveyer upon which the load of fertilizer is supported and by which it is carried to the rear delivery end of the box. At the rear end of the box is a rotatable cylinder or beater provided with radial pins or teeth throughout its circumferential area which turns in such direction that the pins or teeth will work up through the load of fertilizer and disintegrate the same and carry it up over and to the rear to be deposited on the ground. There is also an upper supplementary beater of very similar construction which acts upon the top portion of the load, thereby permitting a very high load to be carried in the wagon box and to be distributed. There is also provided a spreader which operates at the rear of the main beater so as to spread the fertilizer laterally and accomplish an even wide spread of the same as it falls to the ground. A popular form of spreader comprises a shaft mounted upon the sills of the wagon at the rear of the main beater and having thereon paddles disposed obliquely with respect to the axis of the shaft and of an eccentric or volute form so that the several paddles, as the distributor rotates, will successively engage the fertilizer discharged from the beater to divert the same laterally. It is necessary that there be an appreciable clearance between adjacent paddles in order that there will be no interference by any paddle with the distribution from another paddle and, therefore, there are intervals in the operation when the spaces between the paddles next to the beater are quite large and considerable fertilizer drops through these spaces and is lost or not advantageously spread, inasmuch as it will drop directly to the ground in the area between the wagon wheels instead of being spread outside the line of travel of the wheels. It is, therefore, the object of the present invention to provide an attachment which may be easily applied to the fertilizer distributor and by the use of which the fertilizer, which at present is permitted to drop directly to the ground, will be caught and held in such position that it will be taken up by the spreader paddles and thrown laterally so that a wide even distribution of the material will be effected. This stated object, and other objects which will incidentally appear in the course of the following description, are attained in such a mechanism as is illustrated in the accompanying drawings, and the invention resides in certain novel features which will be particularly pointed out in the appended claims.

In the drawings:

Figure 1 is a side elevation of the rear end portion of a fertilizer distributor having the present invention applied thereto, Fig. 2 is an enlarged detail side elevation of the attachment, Fig. 3 is a plan view of the rear beater and spreader with the attachment applied, Fig. 4 is a detail section on the line 4—4 of Fig. 2.

Fig. 5 is a detail elevation of one of the wagon sills showing a modification of the invention, Fig. 6 is a detail of the retarder or retainer bar shown in Fig. 5, Fig. 7 is a side elevation of another modification, and Fig. 8 is a side elevation of a form similar to but slightly different from the form shown in Fig. 7.

Referring more particularly to Fig. 1, the reference numeral 1 indicates a portion of the wagon box which is mounted upon sills 2, projecting beyond the rear end of the box, and supported for travel upon ground wheels 3. The reference numeral 4 indicates a portion of the chain driving the conveyer by which the load is carried rearwardly, and 5 indicates the main beater, while 6 denotes the upper supplemental beater. The spreader includes a shaft 7 mounted in suitable bearings at the rear extremities of the sills 2 and blades 8 which are disposed obliquely with respect to the shaft 7 and are spaced so that adjacent blades or paddles will act successively on the material thrown rearwardly and downwardly by the main beater. Upon referring to Fig. 3, it will be noted that there is a considerable space between the beater and those paddles which are moving away from the beater and only those paddles which are moving upwardly immediately adjacent the beater will catch the fertilizer and throw the same laterally. Obviously, there must be an appreciable clearance between adjacent paddles or blades and the employment of a greater number of paddles to reduce the lost space is impracticable.

In carrying out the present invention, there is provided a pan 9 consisting of a sheet metal plate of rather heavy gage so that it will withstand considerable rough usage and which is bent into the concave form shown clearly in Figs. 1 and 2 of the drawings. This pan is of such length that it will extend from sill to sill and its front and rear side edges are formed into flanges, indicated at 10, to resist buckling. Bracing angle bars 11 are provided at the ends of the pan and are riveted or bolted firmly thereto so that the pan will acquire the necessary strength, and a strap or angle bar 12 may be extended from end to end of the pan and rigidly secured thereto and also to the end braces 11, as shown in Fig. 4. The pan is secured to and between arms 13 which extend upwardly and rearwardly from the pan and are pivotally mounted upon brackets 14 depending from the sills at the rear extremities thereof, gusset plates 15 being provided at the ends of the pan and secured to the same and to the ends of the arms 13 so as to thoroughly reinforce the structure. Retractile springs 16 are attached at their upper ends to the sills 2 in advance of the pivot brackets 14 and have their lower ends engaged with hook bolts 17 which are adjustably mounted in brackets 18 secured to and depending from the lower rear corners of the pan, as shown and as will be understood.

It will now be understood that the material thrown rearwardly and downwardly by the main beater toward the spreader and which ordinarily will escape the spreader blades or paddles will drop onto the pan 9 and will be held by the pan for a sufficient interval to permit successive paddles or blades to take up the same and throw it to the side of the line of travel of the machine. It is possible some of the material will escape the pan, but the quantity of such material is so very slight as to be negligible while the saving effected by the interposition of the pan is very pronounced. It sometimes happens that pieces of wood or other large foreign objects are encountered in the distribution of fertilizer and these foreign matters tend to clog the operation, but with the present arrangement when any such object is passed to the spreader and drops onto the pan the pan will yield sufficiently to permit such object to pass out without causing any damage, the springs 16 immediately returning the pan to its normal position after the object has been discharged. Obviously the tension of the springs may be easily regulated by adjusting the hooks 17.

If desired, fingers or teeth 19 may be set in the front flange 10 of the pan and arranged to alternate with the teeth or pins of the beater, as shown in Fig. 3, so that they may be said to intermesh with the teeth of the beater, and material which becomes wrapped around the teeth of the beater will be engaged and stripped therefrom. The beater is thus kept clear and falling of the material in large bunches is prevented.

The form of the invention shown in Figs. 1 to 4 and which has been described is what I now believe to be the best embodiment of the invention, but it is not necessary that this particular construction and arrangement be used. Excellent results have been obtained with the simple device shown in Figs. 5 and 6 and which consists of a T-bar 20 secured at its ends to the sills 2 at a point between the beater and the spreader and extending from side to side of the material. This T-bar may be made of substantial width and effectually catches and breaks the descent of material which tends to escape the spreader. It is also further advantageous for the reason that it serves as an effectual brace to prevent spreading of the sills which frequently occurs and is a source of weakness in many fertilizer distributors.

Usually the distributor rotates in such direction that the blades nearest the beater move upwardly, but the rotation may be in the opposite direction, in which event the pan should be widened and the brackets 14 possibly shifted forwardly.

In Fig. 7 is shown a pan 21 which is suspended below the sills 2 by brackets secured to and depending from the sills. This pan has its front end disposed under the conveyer so that it catches possible droppings therefrom and its rear end is beneath the distributor where it will receive the material missed by the distributor blades.

The pan 23, shown in Fig. 8, is mounted in the same manner as the pan 21 but has its intermediate portion folded upwardly, as at 24, whereby to extend close to the beater and the distributor.

Having thus described the invention, I claim:

1. An attachment for fertilizer distributors having a beater and a spreader, said attachment comprising a pan adapted to extend from side to side of the fertilizer distributor with its front end adjacent the beater and its rear end adjacent the spreader, and means for yieldably mounting said pan between the spreader and beater of the fertilizer distributor.

2. An attachment for fertilizer distributors having a beater and a spreader, said attachment comprising a pan adapted to extend from side to side of the fertilizer distributor and from the beater to the spreader, and means for pivotally yieldably mounting the pan upon the distributor in position to receive material passing downwardly between the beater and spreader of the fertilizer distributor.

3. An attachment for fertilizer distributors having sills extending rearwardly from its rear end and including a beater, and a spreader mounted on said sills, said attachment comprising a pan adapted to extend from sill to sill, arms secured to the ends of said pan and pivotally mounted at the rear thereof upon the sills, and means for yieldably holding the pan upwardly between the sills in position to receive material passing downwardly between the beater and spreader of the fertilizer distributor.

4. The combination with the rearwardly extending sills of a fertilizer distributor, the beater, and the spreader mounted on said sills, of arms pivoted at their rear ends to the rear end portions of the sills, a pan secured to and between the forward ends of said arm and adapted to extend upwardly between the sills in position to receive material passing downwardly between the beater and spreader of the fertilizer distributor, and retractile springs attached to the sills and to the rear portions of the pan.

5. The combination with the rearwardly propecting sills of a fertilizer distributor, the beater, and spreader mounted on said sills, of arms pivoted at the rear ends of the sills, a pan secured to and between the forward ends of said arms and adapted to extend upwardly between the sills below the spreader, gusset plates connecting the pan and front ends of said arms, and retractile springs attached at their upper ends to the sills and having their lower ends adjustably connected to the rear corners of the pan.

6. An attachment for fertilizer distributors which include a main beater and a spreader at the rear of the beater, said attachment consisting of a pan supported in position to receive material passing downwardly between the beater and the spreader, and teeth projecting from the forward edge of the pan to alternate with the teeth of the beater.

7. An attachment for fertilizer distributors having a beater and a spreader, said attachment consisting of a pan, and means for mounting the pan below the spreader of the machine, the pan having a portion extending upward between the spreader and beater of the machine and fitting close thereto.

8. An attachment for fertilizer distributors of the type which includes a discharging beater and a spreader at the rear of the beater rotatable about a horizontal axis, said attachment consisting of a pan, and means to support said pan on the fertilizer distributor with its front end portion in proximity to the beater to receive material therefrom and its rear end portion in proximity to the spreader and below the latter whereby to hold the received material to the spreader.

9. An attachment for fertilizer distributors having a beater and a spreader, said attachment comprising a pan adapted to extend from side to side of the fertilizer distributor with its front end adjacent the beater and its rear end adjacent the spreader, and means for mounting said pan between the spreader and beater of the fertilizer distributor.

10. An attachment for fertilizer distributors of the type which includes a discharging beater and a spreader at the rear of the beater rotatable about a horizontal axis, said attachment consisting of a pan, and means to support said pan on the fertilizer distributor with its front end portion in proximity to the beater to receive material therefrom and its rear end portion in proximity to the spreader.

In testimony whereof I affix my signature.

THEODORE H. OPPENHEIM. [L. S.]